United States Patent
Zou et al.

(10) Patent No.: US 12,118,226 B2
(45) Date of Patent: Oct. 15, 2024

(54) SYSTEMS, METHODS, AND DEVICES FOR SHUFFLE ACCELERATION

(71) Applicant: Samsung Electronics Co., Ltd., Suwon-si (KR)

(72) Inventors: Chen Zou, Chicago, IL (US); Hui Zhang, San Jose, CA (US); Joo Hwan Lee, San Jose, CA (US); Yang Seok Ki, Palo Alto, CA (US)

(73) Assignee: SAMSUNG ELECTRONICS CO., LTD. (KR)

( * ) Notice: Subject to any disclaimer, the term of this patent is extended or adjusted under 35 U.S.C. 154(b) by 0 days.

(21) Appl. No.: 17/225,085

(22) Filed: Apr. 7, 2021

(65) Prior Publication Data

US 2022/0164122 A1     May 26, 2022

Related U.S. Application Data

(60) Provisional application No. 63/116,801, filed on Nov. 20, 2020.

(51) Int. Cl.
    *G06F 3/00*          (2006.01)
    *G06F 3/06*          (2006.01)

(52) U.S. Cl.
    CPC .......... *G06F 3/0647* (2013.01); *G06F 3/0604* (2013.01); *G06F 3/0679* (2013.01)

(58) Field of Classification Search
    CPC ..... G06F 3/0647; G06F 3/0604; G06F 3/0679
See application file for complete search history.

(56) References Cited

U.S. PATENT DOCUMENTS

| | | | |
|---|---|---|---|
| 9,934,304 B2 | 4/2018 | Beyer et al. | |
| 10,691,597 B1 | 6/2020 | Akkary et al. | |
| 10,824,607 B2 | 11/2020 | Xia et al. | |
| 2004/0098390 A1* | 5/2004 | Bayliss | G06F 7/32 |
| 2013/0332446 A1* | 12/2013 | Zhou | G06F 9/5066 |
| | | | 707/E17.135 |
| 2018/0068005 A1 | 3/2018 | Vemuri et al. | |

OTHER PUBLICATIONS

Dean, Jeffrey et al., "MapReduce: Simplified Data Processing on Large Clusters", Communications of the ACM, vol. 51, Issue 1, Jan. 2008, pp. 107-113.

(Continued)

*Primary Examiner* — Reginald G Bragdon
*Assistant Examiner* — Michael L Westbrook
(74) *Attorney, Agent, or Firm* — Renaissance IP Law Group LLP

(57) ABSTRACT

A method of shuffling data may include shuffling a first batch of data using a first memory on a first level of a memory hierarchy to generate a first batch of shuffled data, shuffling a second batch of data using the first memory to generate a second batch of shuffled data, and storing the first batch of shuffled data and the second batch of shuffled data in a second memory on a second level of the memory hierarchy. The method may further include merging the first batch of shuffled data and the second batch of shuffled data. A data shuffling device may include a buffer memory configured to stream one or more records to a partitioning circuit and transfer, by random access, one or more records to a grouping circuit.

18 Claims, 7 Drawing Sheets

(56) References Cited

OTHER PUBLICATIONS

Istvan, Zsolt et al., "Caribou: Intelligent Distributed Storage", Proceedings of the VLDB Endowment, vol. 10, Issue 11, Aug. 2017, pp. 1202-1213.

Xilinx, "UltraRAM: Breakthrough Embedded Memory Integration on Ultrascale+ Devices", White Paper: UltraScale+ Devices, (https://docs.xilinx.com/v/u/en-US/wp477-ultraram), Jun. 14, 2016, 11 pages.

Zhang, Haoyu et al., "Riffle: Optimized Shuffle Service for Large-Scale Data Analytics", EuroSys '18, Apr. 23-26, 2018, Porto, Portugal, 15 pages.

Cheng, Yuchen et al., "OPS: Optimized Shuffle Management System for Apache Spark," 9TH International Conference on Software Development and Technologies for Enhancing Accessiblity and Fighting, ICPP '20, Aug. 2020, 11 pages.

Do, Jaeyoung et al., "Query Processing on Smart SSDs: Opportunities and Challenges," Proceedings of the 2013 International Conference on Management of Data, SIGMOD '13, Jan. 2013, 10 pages.

European Summons to Oral Proceedings for Application No. 21207097.3, mailed Jun. 25, 2024.

Lee, Joo Hwan et al., "SmartSSD: FPGA Accelerated NearStorage Data Analytics on Ssd," IEEE Computer Architecture Letters, IEEE, USA, vol. 19, No. 2, Jul. 2020, 4 pages.

Shen, Min et al., "Magnet: Push-Based Shuffle Service for Large-Scale Data Processing," Proceedings of the VLDB Endowment, vol. 13, No. 12, Aug. 2020, pp. 3382-3395.

Spark, "Rdd Programming Guide," Spark 3.0.1 Documentation, Nov. 2020, retrieved from the Internet: URL: https://web.archive.org/web/20201111165907/https:11spark.apache.org/docs/latestIrdd-programming-guide.html, 20 pages.

Spark, "Spark Streaming Programming Guide," Oct. 2020, Retrieved from the Internet: URL:https://web.archive. org/web/20201 0031 00351 Ihttps: 11spark.apache.org/docs/latestlstreaming-programming-guide.html, 32 pages.

Wijtemans, Lars, "Enabling FPGA Memory Management for Big Data Applications Using Fletcher," Aug. 2019, Master's Thesis, retrieved from the Internet: URL:https://repository.tudelft.nl/islandora/objectIuuid:297bbOcff211-4700-a159-d330ef78c480/datastream/OBJ/download, 47 pages.

Wikipedia, "Flat memory model," Sep. 2020, retrieved from the Internet: URL:https://en.wikipedia.org/w/index. php?title=Flatmemory_model&oldid=976370493, retrieved on Feb. 22, 2024, 3 pages.

\* cited by examiner $$b_{00} \oplus b_{19} \oplus b_{20} \quad b_{01} \oplus b_{18} \oplus b_{21} \quad b_{02} \oplus b_{17} \oplus b_{22} \quad b_{03} \oplus b_{16} \oplus b_{23} \quad b_{04} \oplus b_{15} \oplus b_{24} \quad b_{05} \oplus b_{14} \oplus b_{25} \quad b_{06} \oplus b_{13} \oplus b_{26} \quad b_{07} \oplus b_{12} \oplus b_{27} \quad b_{08} \oplus b_{11} \oplus b_{28} \quad b_{09} \oplus b_{10} \oplus b_{29}$$

$$\vdots$$

$$= h_{00} \quad = h_{01} \quad = h_{02} \quad = h_{03} \quad = h_{04} \quad = h_{05} \quad = h_{06} \quad = h_{07} \quad = h_{08} \quad = h_{09}$$

FIG. 4

SYSTEMS, METHODS, AND DEVICES FOR SHUFFLE ACCELERATION

CROSS-REFERENCE TO RELATED APPLICATIONS

This application claims priority to, and the benefit of, U.S. Provisional Patent Application Ser. No. 63/116,801 titled "Systems, Methods, and Devices for Shuffle Acceleration" filed Nov. 20, 2020 which is incorporated by reference.

TECHNICAL HELD

This disclosure relates generally to data shuffling, and more specifically to systems, methods, and devices for shuffle acceleration.

BACKGROUND

Data shuffling may be used to redistribute data to multiple nodes of a distributed data processing system to enable the data to be processed in parallel at the nodes.

The above information disclosed in this Background section is only for enhancement of understanding of the background of the invention and therefore it may contain information that does not constitute prior art.

SUMMARY

A method of shuffling data may include shuffling a first batch of data using a first memory on a first level of a memory hierarchy to generate a first batch of shuffled data, shuffling a second batch of data using the first memory to generate a second batch of shuffled data, and storing the first batch of shuffled data and the second batch of shuffled data in a second memory on a second level of the memory hierarchy. The method may further include merging the first batch of shuffled data and the second batch of shuffled data. Shuffling the first batch of data using the first memory may include streaming a portion of the first batch of data from the first memory. The method may further include partitioning the first batch of data based on streaming the portion of the first batch of data. Shuffling the first batch of data using the first memory may include randomly accessing a portion of the first batch of data from the first memory. The method may further include grouping the first batch of data based on randomly accessing the portion of the first batch of data. Grouping the first batch of data may include sorting the first batch of data, and gathering the first batch of data based on the sorting. Sorting the first batch of data may include sorting pointers for the first batch of data. The method may further include generating one or more indices for the first batch of shuffled data based on partitioning the first batch of data. The method may further include merging the first batch of shuffled data and the second batch of shuffled data based on the one or more indices. Merging the first batch of shuffled data and the second batch of shuffled data may include storing the first batch of shuffled data and the second batch of shuffled data in columnar form. Merging the first batch of shuffled data and the second batch of shuffled data may include merging the first batch of shuffled data and the second batch of shuffled data on a storage device.

A data shuffling device may include a partitioning circuit, and a buffer memory configured to store one or more records, and stream one or more first portions of the one or more records to the partitioning circuit. The buffer memory may be further configured to store at least one of the one or more records and stream the one or more first portions of the one or more records in parallel. The buffer memory may be further configured to stream the one or more first portions of the one or more records to the partitioning circuit and fetch one or more second portions of the one or more records in parallel. The partitioning circuit may be configured to perform a sort operation on the one or more first portions of the one or more records in parallel with the buffer memory storing at least one of the one or more records. The partitioning circuit, and the buffer memory are configured to operate on batches of the one or more records. The data shuffling device may further include a grouping circuit, wherein the buffer memory may be further configured to transfer, by random access, at least one of the one or more records to the grouping circuit.

A data shuffling device may include a grouping circuit, and a buffer memory configured to store one or more records, and transfer, by random access, at least one of the one or more records to the grouping circuit. The data shuffling device may further include a sorting circuit configured to sort the one or more records to generate a sort output, wherein the grouping circuit may be configured to group the one or more records based on the sort output.

BRIEF DESCRIPTION OF THE DRAWINGS

The figures are not necessarily drawn to scale and elements of similar structures or functions may generally be represented by like reference numerals or portions thereof for illustrative purposes throughout the figures. The figures are only intended to facilitate the description of the various embodiments described herein. The figures do not describe every aspect of the teachings disclosed herein and do not limit the scope of the claims. To prevent the drawings from becoming obscured, not all of the components, connections, and the like may be shown, and not all of the components may have reference numbers. However, patterns of component configurations may be readily apparent from the drawings. The accompanying drawings, together with the specification, illustrate example embodiments of the present disclosure, and, together with the description, serve to explain the principles of the present disclosure.

FIG. 4 illustrates an embodiment of a partitioning scheme in accordance with example embodiments of the disclosure.

DETAILED DESCRIPTION

Overview

Figure 1:
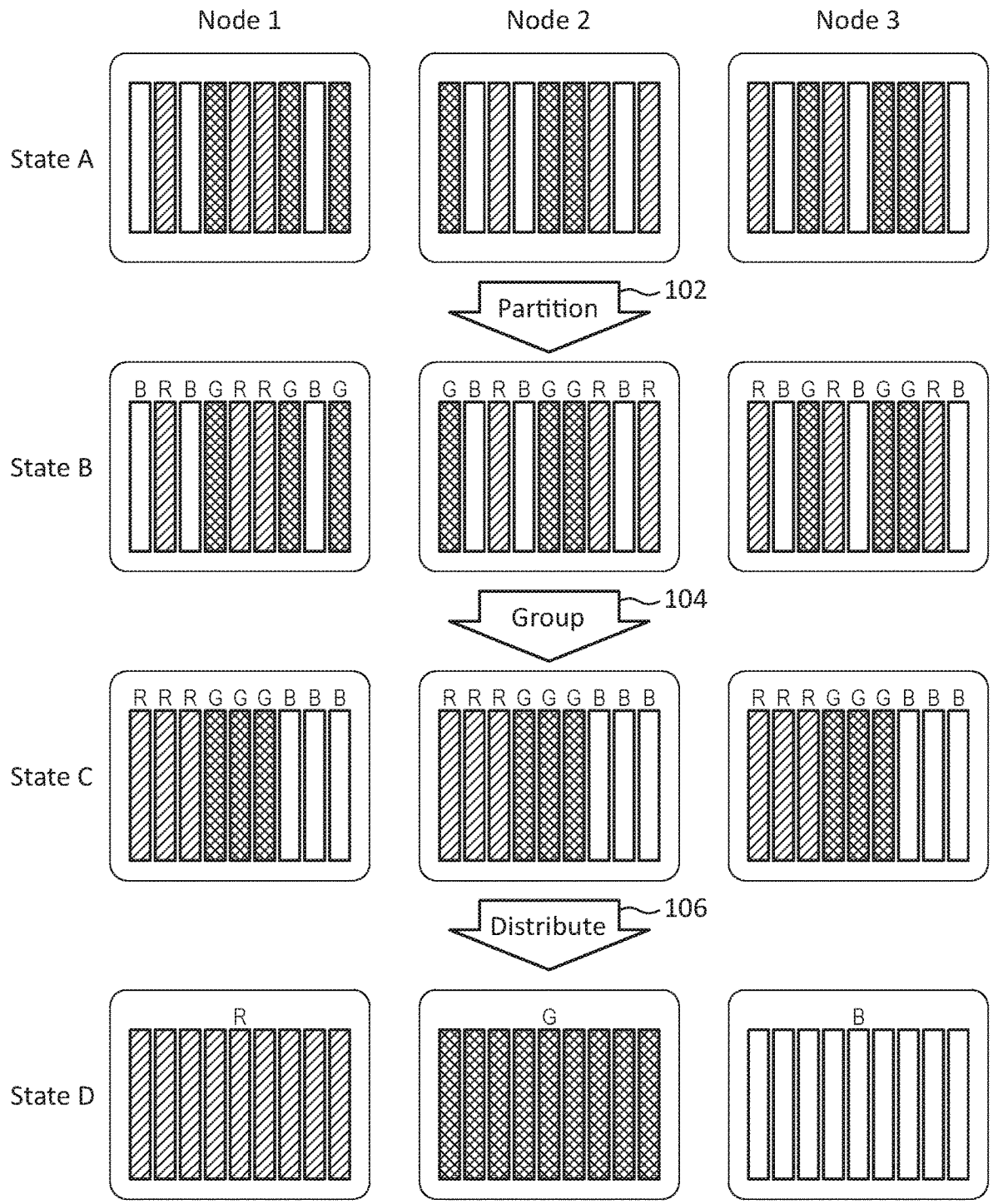
FIG. 1 illustrates an example embodiment of a data shuffle operation in accordance with example embodiments of the disclosure.

Data shuffling may be used to redistribute data to multiple nodes of a distributed data processing system to enable the data to be processed in parallel at the nodes. In some embodiments, data shuffle operations may consume a large percentage of processing and/or memory resources to perform tasks associated with shuffling data. Data shuffle operations may also consume a large percentage of network bandwidth to move data between storage devices and processing resources. Thus, in some embodiments, data shuffle operations may cause a performance bottleneck in distributed data processing systems. For example, data shuffling may consume upwards of 40 percent of central processing unit (CPU) time in distributed online analytical processing (OLAP) systems.

A shuffle acceleration architecture in accordance with example embodiments of the disclosure may implement a leveled shuffling scheme in which data shuffle operations may be performed at different levels of a memory hierarchy. For example, a shuffle accelerator may shuffle batches of data using internal memory resources at a first hierarchy level that may provide fast and/or efficient memory accesses for batch shuffle operations. The results of the batch shuffle operations may then be merged into external memory resources at a second hierarchy level that may operate at a larger granularity and/or may provide greater capacity, datawidth matching, sequential access, and/or the like. Any number of batches may be shuffled and/or merged.

In some embodiments, a shuffle accelerator may implement a scratchpad memory buffer that may provide random memory accesses for a gathering process in a grouping operation while also providing streaming memory accesses for a partitioning operation.

In some embodiments, a shuffle acceleration architecture may implement one or more mechanisms to exploit one or more types of parallelism to achieve higher throughput. For example, a shuffle accelerator may exploit data-level parallelism by implementing a relatively wide data path for processing entire records or large portions of records during a grouping operation. As another example, a shuffle accelerator may exploit subtask-level parallelism by overlapping prefetching operations, partitioning operations, and/or the like. As a further example, task-level parallelism may be exploited by implementing multiple batch processing shuffle accelerators that may overlap operations such as the grouping of a current batch and the partitioning of a previous batch.

The principles disclosed herein have independent utility and may be embodied individually, and not every embodiment may utilize every principle. However, the principles may also be embodied in various combinations, some of which may amplify the benefits of the individual principles in a synergistic manner.

Moreover, in some embodiments, the features described above may be combined synergistically with one or more additional techniques including: software techniques such as improved storage input and/or output (I/O or IO) patterns, merging intermediate shuffle results to tune storage access granularity, and/or the like; memory expansion techniques such as the use of non-volatile memory for larger capacity to reduce spilling overhead, remote shuffling, and/or the like; network acceleration techniques such as remote direct memory access (RDMA) and/or the like; serialization techniques, and/or the like.

Data Shuffling

FIG. 1 illustrates an example embodiment of a data shuffle operation in accordance with example embodiments of the disclosure. The embodiment illustrated in FIG. 1 may be performed on a distributed processing system having three nodes: Node 1, Node 2, and Node 3. Each node may initially receive nine randomly distributed records as shown in state A. During a partition operation 102, the records in each node may be labeled with a partition identifier (ID) by applying a partitioning scheme based on a shuffle key for the records. The partition ID may determine the final destination partition for each record. Examples of partitioning schemes include hash-based schemes, range-based schemes, and/or the like. In this example, the records may be divided into three partitions based on color as the shuffle key: red, green, and blue as shown in state B.

During a grouping operation 104, the records within each node may be grouped as shown in state C according to their destination partitions based on a grouping scheme. Examples of grouping schemes include bucket schemes, sorting schemes, and/or the like. In some embodiments, a sort-based grouping scheme may sort each record by the partition ID of each record, then gather the records into groups that may be destined for the same partition.

During a distribution operation 106, records from each node may be redistributed to the nodes or other destinations based on the partition ID such that all records with a specific partition ID may arrive at the same node (as shown in state D) or other destination.

In some embodiments, shuffle operations may be challenging to implement with general purpose processors and memory architectures. For example, the grouping operation 104 may involve data-intensive random accesses of large working datasets with little or no data re-use which may result in low utilization of cache-based memory hierarchies. As another example, in some embodiments of partitioning schemes, partitioned results may not fit in memory and therefore may spill into storage devices. This may result in increased network traffic between processing resources and one or more storage devices, both during a partitioning operation and/or a later grouping operation.

Shuffle Acceleration

A shuffle acceleration scheme in accordance with example embodiments of the disclosure may offload one or more shuffle tasks to an accelerator, for example, at a computational storage device. Depending on the implementation details, this may improve the throughput and/or efficiency of shuffle operations, reduce network traffic between storage devices and centralized processing resources, liberate processing and/or memory resources for other tasks, and/or the like. Moreover, a shuffle accelerator in accordance with example embodiments of the disclosure may implement a microarchitecture and/or memory hierarchy that may further improve the throughput and/or efficiency of processes that may be specific to shuffle operations.

Figure 2:
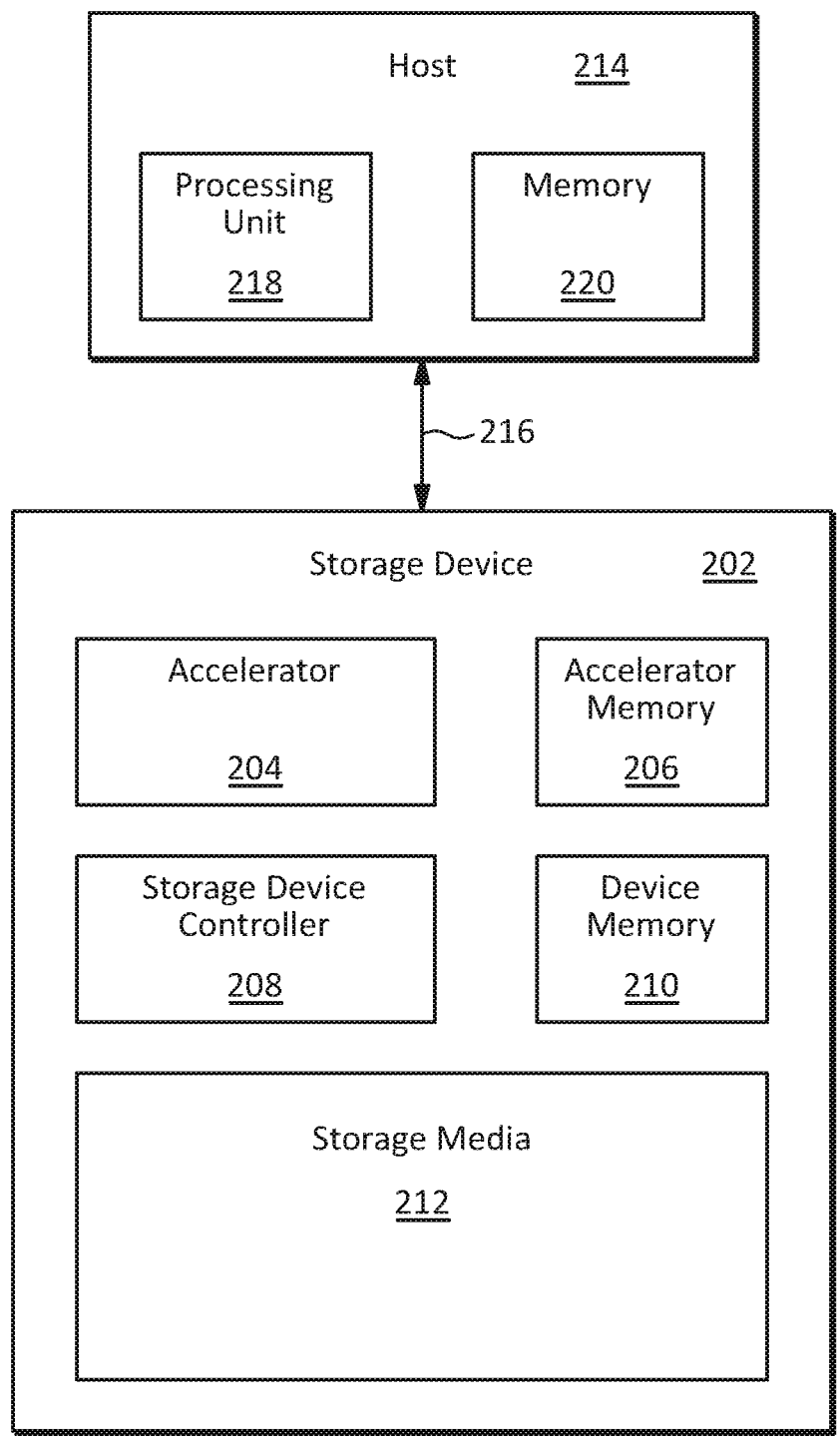
FIG. 2 illustrates an embodiment of a shuffle acceleration scheme in accordance with example embodiments of the disclosure.

FIG. 2 illustrates an embodiment of a shuffle acceleration scheme in accordance with example embodiments of the disclosure. The embodiment illustrated in FIG. 2 may be used, for example, to implement a node of a distributed processing system. The embodiment illustrated in FIG. 2 may include a storage device 202 having a shuffle accelerator 204, an accelerator memory 206, a storage device controller 208, a storage device memory 210, and storage media 212. The storage device 202 may be connected to a host 214 through a communication link 216. The host 214 may include a processing unit 218 and a host memory 220.

The shuffle accelerator 204 may implement any of the shuffle systems, methods, architectures, techniques, and/or the like disclosed herein. The shuffle accelerator 204 may be implemented with hardware, software, or any combination thereof. For example, in some embodiments, the accelerator may be implemented with combinational logic, sequential logic, one or more timers, counters, registers, state machines, volatile memories such as dynamic random access memory (DRAM) and/or static random access memory (SRAM), nonvolatile memory such as flash memory including not-AND (NAND) memory, persistent memory such as cross-gridded nonvolatile memory, memory with bulk resistance change, and/or the like, and/or any combination thereof, complex programmable logic devices (CPLDs), field programmable gate arrays (FPGAs), application specific integrated circuits (ASICs), CPUs such a complex instruction set computer (CISC) processors such as x86 processors and/or reduced instruction set computer (RISC) processors such as ARM processors, and/or the like, executing instructions stored in any type of memory, graphics processing units (GPUs), neural processing units (NPUs), tensor processing units (TPUs), and/or the like.

The accelerator memory 206, or a portion thereof, may implement, at least in part, a first level of a memory hierarchy. The accelerator memory 206 may be implemented with DRAM, SRAM, flash memory, persistent memory, and/or the like. In some embodiments, the accelerator memory 206 may be at least partially integral with the shuffle accelerator 204.

The storage device 202 may be implemented with any type of storage device that may use any type of storage media 212, for example, a hard disk drive (HDD) which may include magnetic storage media, a solid state drive (SSD) which may include solid state storage media such as not-AND (NAND) flash memory, an optical storage device, a storage device based on any type of persistent memory such as cross-gridded nonvolatile memory, memory with bulk resistance change, and/or the like, and/or any combination thereof. In some embodiments, storage device 202 may be used in one or more servers configured, for example, in one or more server chassis, server racks, groups of server racks, server clusters, datarooms, datacenters, edge data centers, mobile edge datacenters, and/or the like, and/or any combination thereof.

The storage device controller 208 may be implemented with hardware, software, or any combination thereof as described above with respect to the shuffle accelerator 204. In some embodiments in which the storage device 202 is implemented as an SSD, the storage device controller 208 may include, or be included in, a flash translation layer (FTL).

The storage device memory 210, or a portion thereof, may implement, at least in part, a second level of a memory hierarchy. The storage device memory 210 may be implemented with DRAM, SRAM, flash memory, persistent memory, and/or the like. In some embodiments, the storage device memory 210 may be at least partially integral with the storage device controller 208.

The host 214 may be implemented with any type of processing unit 218 such as one or more CPUs, GPUs, NPUs, TPUs, and/or the like, and any type of memory 220 such as DRAM, SRAM, flash memory, persistent memory, and/or the like.

The communication link 216 may be implemented with any type of network resources, interconnect resources, and/or the like. Examples of network and/or interconnect resources may include any type of network fabric such as Ethernet, Fibre Channel, InfiniBand, and/or the like, using any type of network protocols such as Transmission Control Protocol/Internet Protocol (TCP/IP), Remote Direct Memory Access (RDMA) over Converged Ethernet (RoCE), and/or the like, any type of interconnect and/or storage interfaces and/or protocols such as Peripheral Component Interconnect Express (PCIe), Serial ATA (SATA), Small Computer Systems Interface (SCSI), Serial Attached SCSI (SAS), Non-Volatile Memory Express (NVMe), NVMe-over-fabric (NVMe-oF), and/or the like.

In some embodiments, any of the components of the storage device 202 may be connected using any type of interconnect, interface, protocol, and/or the like including any generation of double data rate (DDR) interlace, Open Memory Interface (OMI), PCIe, Compute Express Link (CXL), Advanced eXtensible Interface (AXI), Open Coherent Accelerator Processor Interface (OpenCAPI), Gen-Z, and/or the like.

Accelerator Architecture

Figure 3:
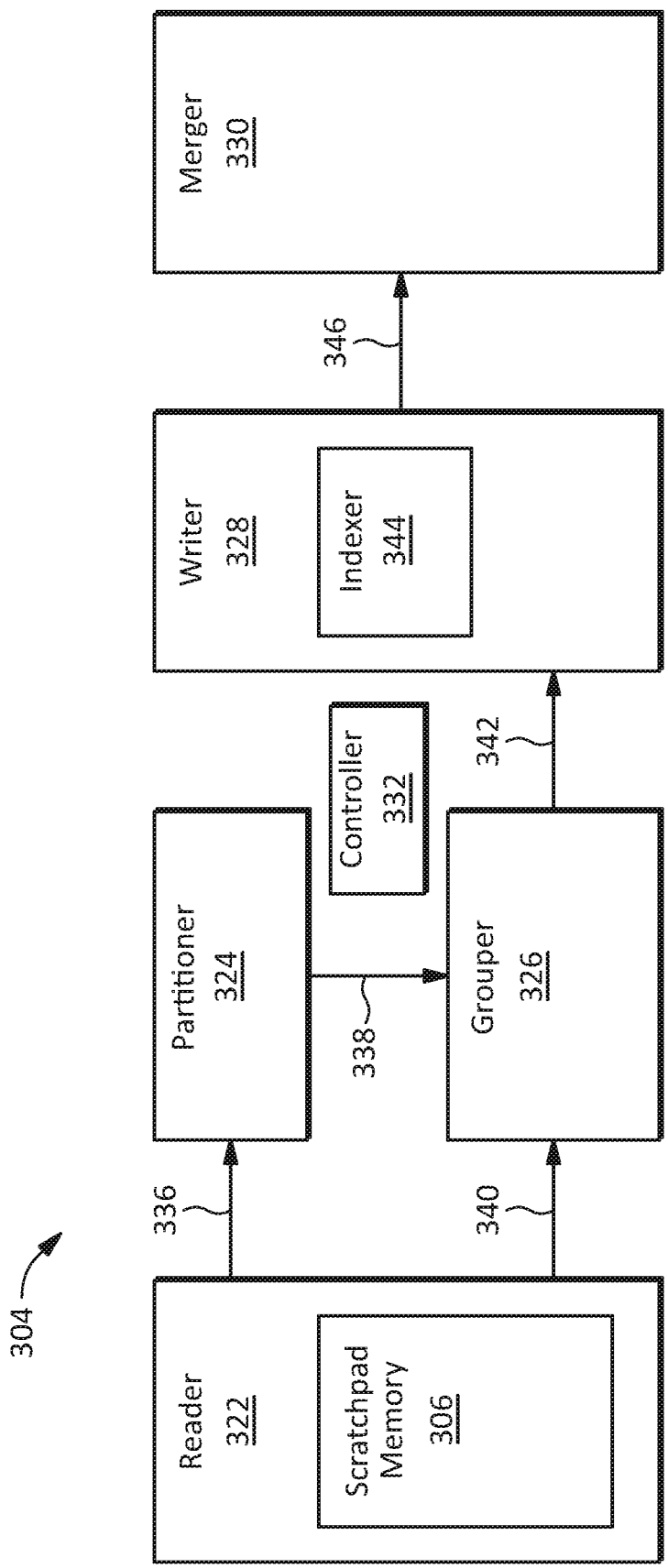
FIG. 3 illustrates an embodiment of a shuffle accelerator architecture in accordance with example embodiments of the disclosure.

FIG. 3 illustrates an embodiment of a shuffle accelerator architecture in accordance with example embodiments of the disclosure. The shuffle accelerator 304 illustrated in FIG. 3 may be used, for example, to implement the shuffle accelerator 204 illustrated in FIG. 2 and/or a shuffle operation for one of the nodes (e.g., Node 1, Node 2, or Node 3) illustrated in FIG. 1.

In some embodiments, the shuffle accelerator 304 illustrated in FIG. 3 may perform shuffle operations on batches of input data. The results of the batch shuffles may be merged to provide an output with greater granularity. The shuffle accelerator 304 may include a reader 322, a partitioner 324, a grouper 326, a writer 328, a merger 330, and a controller 332.

The reader 322 may prefetch input data records and store them in a scratchpad memory 306 which may be part of a first level of a memory hierarchy. The reader 322 may manage the scratchpad memory 306 as a buffer to provide streaming memory access of keys to the partitioner 324 and to provide random access of records to the grouper 326.

In some embodiments, input data to be shuffled may be in the form of a table with rows and columns. In some embodiments, a row may contain a record, and one column of the record may contain a key for the record. The partitioner 324 may receive a stream of keys 336 from the reader 322 and apply a partitioning scheme to partition the records by keys to generate a sort table in which records may be represented as tuples of a partition ID and a row ID (Pid, RowID) and which may be sorted, for example, by partition ID.

The grouper 326 may perform a grouping operation by receiving a stream of sorted tuples 338 from the partitioner 324 and gathering corresponding records (e.g., rows) 340 from the reader 322 through random accesses of the scratchpad memory 306.

The writer 328 may receive and buffer a stream of shuffled batches of records 342 from the grouper 326. The writer may write the records, for example, to an external memory that may be part of a second level of a memory hierarchy. The writer may include an indexer 344 that may generate indices to identify portions of output data that belong to each partition in a batch.

The merger 330 may merge batches of shuffled output data 346 from the writer 328 into blocks based on the indices generated by the indexer 344. In some embodiments, the merger 330 may arrange the data so that some or all records (e.g., rows) may be arranged by partition ID.

The controller 332 may control the overall operation of the shuffle accelerator 304 including any or all of the individual components thereof, for example, to implement a batched shuffle scheme.

Partitioning

FIG. 4 illustrates an embodiment of a partitioning scheme in accordance with example embodiments of the disclosure. Although the embodiment illustrated in FIG. 4 may be used, for example, with any of the embodiments of shuffle acceleration methods, apparatus, and/or the like disclosed herein, the embodiments of shuffle methods, apparatus, and/or the like disclosed herein may be used with any other partitioning scheme.

The embodiment illustrated in FIG. 4 may be based on a folding hash having layers of bits in which bit $b_i$ may be the i-th bit of the shuffle key, and $h_j$ may be the j-th bit of output. However, the embodiment illustrated in FIG. 4 may integrate an additional technique of reversing bits in the shuffle key on alternate folds. Thus it may be described as a zigzag-fold hash. In some embodiments, and depending on the implementation details, reversing the bits on each layer may improve robustness and/or evenness of the hash function.

Grouping

The shuffle acceleration methods, apparatus, and/or the like disclosed herein are not limited to use with any particular grouping scheme. However, in some embodiments, sort-based grouping may integrate well with a shuffle acceleration architecture. A sort-based grouping scheme may sort records (potentially in place) by a partition label (e.g., a partition ID) that may be assigned by a partitioning process.

In some embodiments, rather than sorting records directly, a shuffle accelerator may sort pointers to the records. For example, a sorting process may generate a sort table containing tuples of a partition ID and a pointer to the corresponding record. The sort table may be sorted by partition ID, and the grouping operation may then perform a gather operation using the sorted pointers. In some embodiments, and depending on the implementation details, this may reduce the complexity of data copy operations from O(log N) to O(1) per record. Thus, in some embodiments, a grouping operation may be implemented as a sorting process combined with a gathering process.

Microarchitecture

Figure 5:
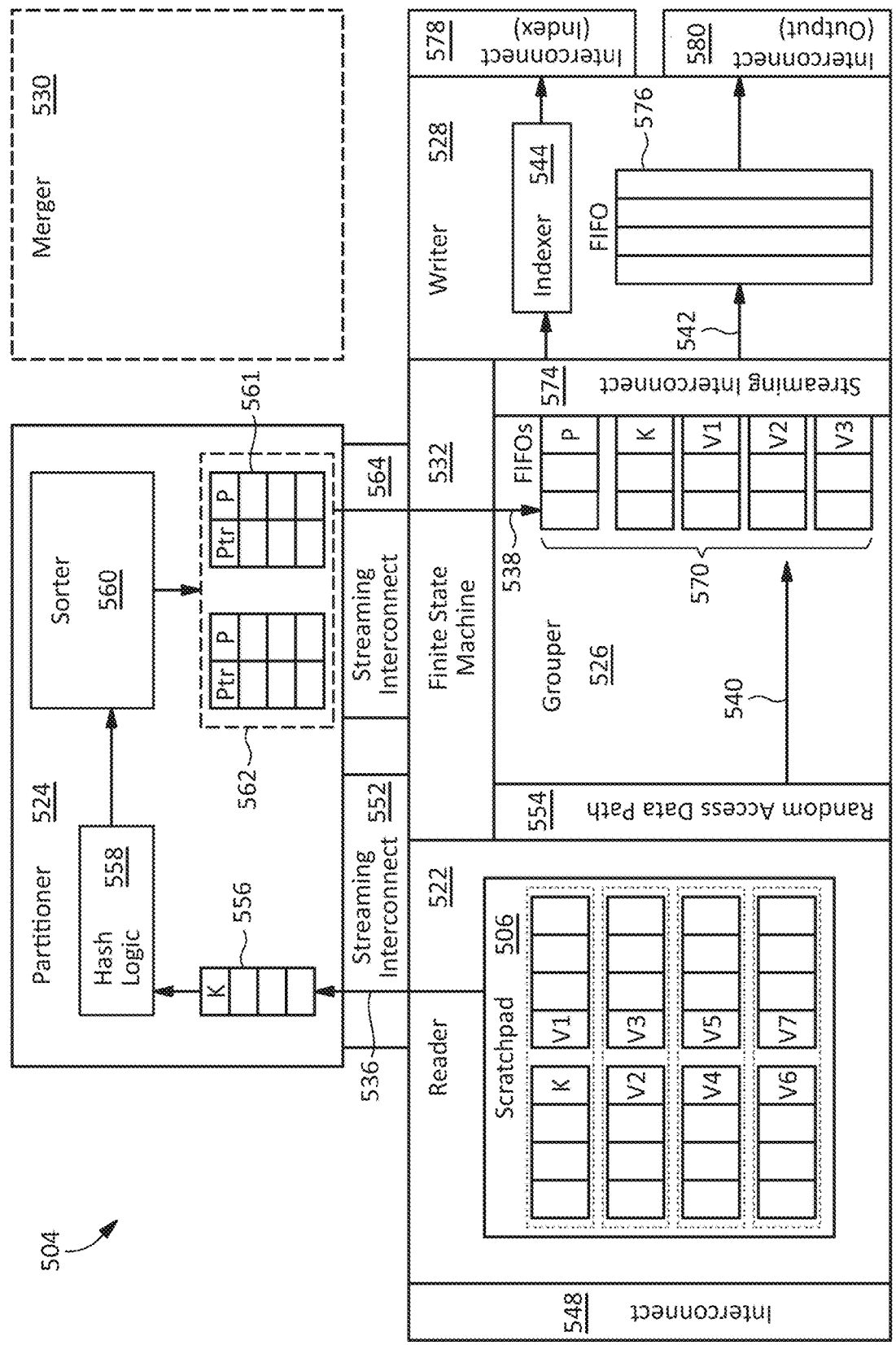
FIG. 5 illustrates an embodiment of a shuffle accelerator microarchitecture in accordance with example embodiments of the disclosure.

FIG. 5 illustrates an embodiment of a shuffle accelerator microarchitecture in accordance with example embodiments of the disclosure. The shuffle accelerator 504 illustrated in FIG. 5 may be used, for example, to implement any of the shuffle acceleration apparatus and/or methods described herein, including, for example, the shuffle accelerator 204 illustrated in FIG. 2, the shuffle accelerator 304 illustrated in FIG. 3, a shuffle operation for one of the nodes illustrated in FIG. 1, and/or the like. The embodiment illustrated in FIG. 5 may be described in the context of some example implementation details such as a specific sorting scheme, sort table, partitioning scheme, interconnects and associated interfaces and/or the like, but the principles may be applied to other embodiments with other implementation details.

The shuffle accelerator 504 illustrated in FIG. 5 may include a reader 522, a partitioner 524, a grouper 526, a writer 528, a merger 530, and a controller 532, which, in this example, may be implemented with a finite state machine (FSM). An example embodiment of the merger may be illustrated in more detail in FIG. 6.

Referring to FIG. 5, the reader 522 may fetch input data, for example, in the form of batches, through an interconnect 548. The input data may be stored in a scratchpad memory 506. In some embodiments, the input data may be in the form of table records in which each record may include a row of data having multiple columns. One of the columns may include a key K, and other columns may include other data, for example, values V1, V2, V3, . . . . The reader 522 may manage the scratchpad memory 506 as a buffer that may provide a stream of output keys 536 to the partitioner 524 through a streaming interconnect 552, while also providing fast and/or efficient random access of data to the grouper 526 through a random access data path 554.

In some embodiments, the scratchpad memory 506 may be part of a first level of a memory hierarchy. For example, in an embodiment in which the accelerator 504 is implemented with an FPGA in a computational storage device as illustrated in FIG. 2, the scratchpad memory 506 may be implemented with internal SRAM in the FPGA 204, and the accelerator memory 206 (which may be, e.g., DRAM that is internal or external to the FPGA) may be part of a second level of the memory hierarchy. Alternatively, or additionally, the storage device memory 210 (e.g., DRAM) may be part of the second level of the memory hierarchy.

In some embodiments, the reader 522 may support sub-task parallelism in which partitioning and sorting operations in the partitioner 524 may overlap data fetching for the scratchpad memory 506. For example, the reader 522 may first fetch one or more key columns from external memory through the interconnect 548 and stream the one or more keys to the partitioner through the streaming interconnect 552 so the partitioner may perform partitioning and/or sorting operations on the one or more keys while the reader 522 fetches other columns of one or more records (e.g., rows) from a table in external memory.

The reader 522 may also support sub-task and/or data parallelism with the grouper 526 in some embodiments. For example, the reader 522 may include a ping-pong style scratchpad buffer that may provide the grouper 526 with random access of buffered records from a previous batch of input data while the reader fetches a new batch of input data from an external table.

In some embodiments, the reader 522 may implement any number of the following features and/or provide any number of the following benefits: bandwidth matching for incoming data traffic from external memory (e.g., second level memory); flexible random access of data for data-level parallelism in a grouping operation of a shuffle implementation; effective use of scratchpad memory capacity while maintaining programmability of different column types; overlapping the partitioning process with scratchpad management of non-key data for subtask-level parallelism.

In some embodiments, to enable the scratchpad memory 506 to provide high-speed streaming access to the partitioner 524 while also providing wide random access to the grouper 526 for shuffle grouping, the reader may include a layout and/or alignment in which an entire record (in OLAP applications, an entire row) may be read out from the scratchpad memory 506 during one cycle of the scratchpad memory (e.g., an SRAM clock in an FPGA). In some embodiments, the record layout may span multiple banks of memory.

The partitioner 524 may include a key buffer 556 to store keys K received from the scratchpad memory 506, hash logic 558 to generate a partition ID for each record, and a sorter 560 and sort table buffer 562 to store a table of sorted records.

The partitioner 524 may implement a hash-based partitioning scheme by assigning a partition ID (Rid) generated by the hash logic 558 to each record. For example, the partitioner 524 may create a tuple including a partition ID and record ID (e.g., row ID) for each record. The sorter 560 may then sort the tuples to generate a sort table that may be stored in the sort table buffer 562.

In some embodiments, the sorter 560 may implement a merge sort scheme which may provide an efficient sorting process, but other sorting schemes may be used. In some embodiments, the hash logic 558 may implement a zigzag-fold hash as illustrated in FIG. 4 which may provide statistically even and/or efficient hash partitioning, but other hash functions may be used. Although the partitioner 524 is illustrated as implementing a hash-based partitioning scheme, other partitioning schemes such as range-based partitioning may be used. For example, in some embodiments, the partitioner 524 may be implemented with a flexible microarchitecture to enable the partitioner to programmatically switch between different partitioning schemes while still providing subtask-level parallelism. In some embodiments, the partitioner may include a ping-pang style buffer to support subtask parallelism in a sorting and partition subtask pipeline.

In some embodiments, rather than sorting records directly, the sorter may sort pointers to the records as mentioned above. For example, the sorter 560 may generate a sort table 561 as shown in the sort table buffer 562 containing tuples which may each include a partition ID (P) and a pointer (Ptr) to the corresponding record (which may be based, for example, on a record ID (e.g., row ID)). The sort table 561 may be sorted by partition ID and streamed through another streaming interconnect 564 to the grouper 526. Thus, in some embodiments, only keys of records may be streamed to the partitioner rather than the actual records.

The grouper 526 may implement a sort-based grouping scheme by reading in the stream of sorted tuples 538 from the sort table 561 and gathering the records 540 corresponding to the pointers from the scratchpad memory 506 through the random access data path 554. The records 540 read by the grouper 526 may already be grouped by partition ID (P) because the pointers (Ptr) may be grouped by partition ID by the sorter 560. The grouper 526 may then store the grouped records in one or more first-in, first-out (FIFO) buffers 570.

In some embodiments, the scratchpad memory 506 may implement a relatively wide data path 554 to provide fast and/or efficient random access which may enable the grouper 526 to implement the grouping operation as a sort-plus-gather scheme.

The writer 528 may receive streams of grouped records 542 through another streaming interconnect 574 and store the records in an output FIFO buffer 576. The writer 528 may include an indexer 544 which may generate a stream of partition-major indices (e.g., index marks on the boundaries of data in different partitions). The writer 528 may identify the contiguous regions of each shuffled batch of data belonging to the same partition. In some embodiments, because the records (e.g., rows) may already be sorted by partition ID, identifying a contiguous region for each partition may only involve determining how many records have the same partition ID. The writer 528 may transfer indices and corresponding data records to the merger 530 through an index interconnect 578 and a data output interconnect 580, respectively.

In some embodiments, the writer 528 may implement any number of the following features and/or provide any number of the following benefits. The writer 528 may manage the write buffer 576 and/or indexer 544 to process shuffle data in batches. The writer 528 may accept row-major input from the scratchpad memory 506 to exploit data-level parallelism. The writer 528 may fold multiple narrow records (e.g., rows) of data to fit an external memory interface width, which may improve external write efficiency. The writer 528 may generate partition-major indexes to facilitate address generation and/or fetching processes in the merger 530. The writer 528 may generate data in a row-major intermediate output format which may increase the read performance of the merger 530.

The finite state machine 532 may control the overall operation of the shuffle accelerator 504 including any or all of the individual components thereof, for example, to implement a batched shuffle scheme. The interconnects 548, 552, 564, 574, 578, and 580 may be implemented with any interconnects, interfaces, protocols, and/or the like including any PCIe, CXL, AXI, and/or the like. In some embodiments, actual records may be streamed to the partitioner 524 and then to the grouper 526, rather than just keys and partition IDs.

Figure 6:
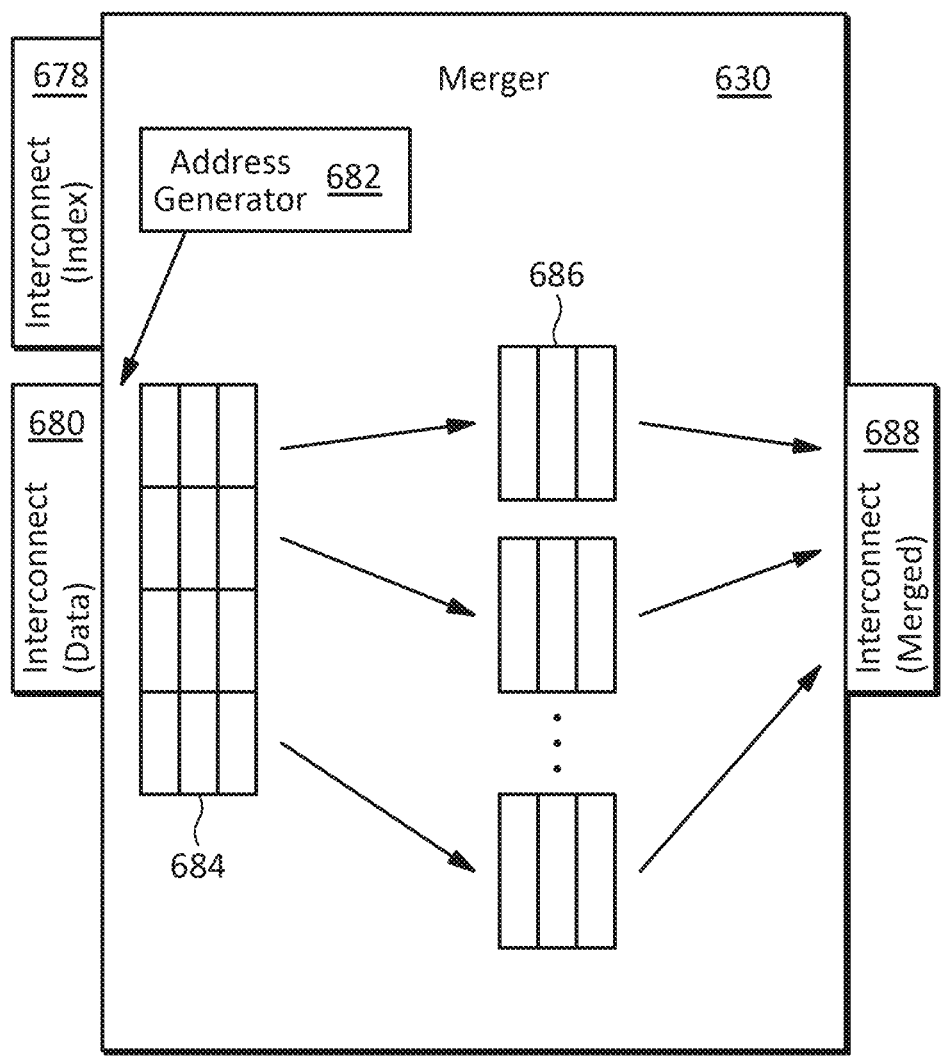
FIG. 6 illustrates an embodiment of a merger microarchitecture in accordance with example embodiments of the disclosure.

FIG. 6 illustrates an embodiment of a merger microarchitecture in accordance with example embodiments of the disclosure. The merger 630 illustrated in FIG. 6 may receive indices and corresponding data from the writer 528 through an index interconnect 678 and a data interconnect 680, respectively. The received data may be stored in a buffer 684. The merger 630 may merge batches of shuffled data to group records (e.g., rows) destined for the same final partition together across batches, for example, in buffers 686. In some embodiments, the merger 630 may implement a merging operation by iterating over all of the partition IDs and group the records in each batch going to the same partition. The merger 630 may include address generation logic 682 which may receive a stream of indices from the index interconnect 678 and generate addresses pointing to the boundaries of the specific partitions in each batch. The merger 630 may write the merged batches of shuffled data to an external memory or other destination, for example, through an interconnect 688.

In some embodiments, the merger 630 may implement any number of the following features and/or provide any number of the following benefits. The merger 630 may provide buffering and/or data width matching between each column output and an external data path. The merger 630 may expose a columnar output format which may facilitate integration with components that may implement the distribution portion of a shuffle scheme. For example, converting the output from the writer 528 to a columnar output format may enable subsequent columnar compression techniques, e.g., for use with communication links, some of which may have a higher compression ratio. Depending on the implementation details, this may increase performance and/or reduce energy consumption Leveled Shuffling for Memory Hierarchy In some embodiments, shuffle systems, methods and/or devices may be adapted or optimized for data-intensive shuffle workloads. For example, a shuffle scheme may be implemented in batches where the batch size may be limited by the internal memory resources of an accelerator. The internal memory (e.g., scratchpad memory) may form a first level of a memory hierarchy that may provide fast and/or efficient random access for a gathering process in the grouping portion of a shuffle scheme. The batch shuffle results may then be merged by grouping the portions, for example, by manipulating the contents of external memory, which may form a second level of the memory hierarchy. Data movement at the second level may be in the form of blocks which may have a larger granularity (e.g., provided by the specifics of a merge operation), and therefore, may utilize the full bandwidth of the second level (e.g., external) memory.

In some embodiments, depending on the implementation details and/or workload demands, a third level of the hierarchy may be implemented in which the results of a batch shuffle operation may be merged externally, for example, on a storage device by manipulating the blocks of data. In some embodiments, a shuffle accelerator may interface and/or integrate with the flash translation layer of an SSD, for example, to reorganize the mapping of the batch shuffle data to achieve virtual merging.

Scratchpad Memory

In some embodiments, as described above, a grouping operation may involve a gathering process. In some embodiments, each record (e.g., row of a table) may only be gathered once during the grouping operation, and thus, there may be little or no temporal locality during a gathering process. Moreover, a gathering process may involve many random accesses of a large working dataset, and therefore, there may be little or no spatial locality. Thus, the use of a cache structure for the grouping portion of a shuffle scheme may incur latency and/or energy overhead associated with fetching more data (e.g., based on a cache line size) and/or may waste internal memory resources.

In some embodiments of shuffle systems, methods and/or devices in accordance with example embodiments of the disclosure, a scratchpad memory may provide efficient streaming and/or random access that may support batch shuffling as the first-level of a leveled shuffle process. In some embodiments, a scratchpad memory may be implemented as flat memory. In some embodiments, the flat memory may be implemented without tag arrays for locality exploitation because there may be little or no locality in the data.

Parallelism

In some embodiments of shuffle systems, methods and/or devices in accordance with example embodiments of the disclosure, one or more types of parallelism may be exploited. For example, in some embodiments, a shuffle grouping subtask may implement data-level parallelism by transferring entire records which may be reordered using sorted pointers. In some embodiments, a scratchpad memory may feature a relatively wide data path to accommodate random accesses to exploit data-level parallelism.

Subtask-level parallelism may also be exploited, for example, by overlapping prefetching of data in a reader with partitioning and/or pointer sorting processes in a partitioner. In some embodiments, this parallelism may be exploited by prioritizing the prefetching of keys and streaming in the keys to a partitioner at the same time. With keys fetched, the prefetching of other values in a record may be overlapped with the partitioning of keys and pointer sorting in a partitioner.

Task-level parallelism may also be exploited across data batches to be shuffled, for example, by utilizing multiple shuffle accelerators in parallel to achieve higher throughput. In some embodiments, subtasks may be pipelined through multi-threading.

In implementations where external memory bandwidth may impose limits on the scaling out of accelerators, a shuffle accelerator architecture and/or microarchitecture in accordance with example embodiments of the disclosure may enable the overlapping of a grouping operation of a current batch and a partitioning operation of a previous batch. In some embodiments, and depending on the implementation details, this may hide the latency of the external memory and exploit subtask-level parallelism instead.

Adaptive Execution of Shuffle Tasks

In some embodiments, small shuffle tasks (e.g., in terms of total data size to be shuffled) may result in reduced performance. For example, starting a shuffle batch on a storage accelerator may implicate synchronization overhead which may be amplified with multiple small batches. Also, small shuffle tasks may result in small output blocks for each column and/or each destination partition. This may result in a sub-optimal memory access pattern during batch merging.

Thus, in some embodiments, shuffle tasks may be adaptively grouped for execution. For example, the start of a shuffle task may be delayed by a finite state machine when the amount of data to be shuffled is below a threshold. Two or more shuffle tasks may then be grouped together which may result in stable shuffle accelerator performance.

Figure 7:
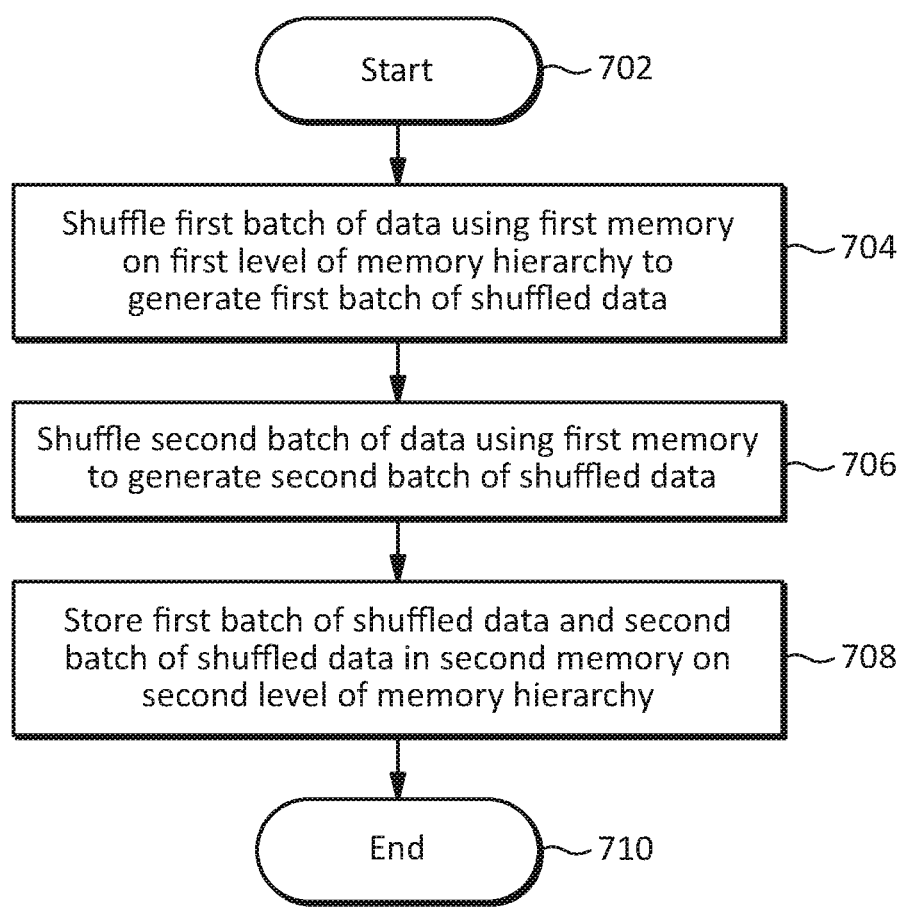
FIG. 7 illustrates an embodiment of a method of shuffling data in accordance with example embodiments of the disclosure.

FIG. 7 illustrates an embodiment of a method of shuffling data in accordance with example embodiments of the disclosure. The method may begin at operation 702. At operation 704, the method may shuffle a first batch of data using a first memory on a first level of a memory hierarchy to generate a first batch of shuffled data. At operation 706, the method may shuffle a second batch of data using the first memory to generate a second batch of shuffled data. At operation 708, the method may store the first batch of shuffled data and the second batch of shuffled data in a second memory on a second level of the memory hierarchy. The method may end at operation 710.

The embodiment illustrated in FIG. 7, as well as all of the other embodiments described herein, are example operations and/or components. In some embodiments, some operations and/or components may be omitted and/or other operations and/or components may be included. Moreover, in some embodiments, the temporal and/or spatial order of the operations and/or components may be varied. Although some components and/or operations may be illustrated as individual components, in some embodiments, some components and/or operations shown separately may be integrated into single components and/or operations, and/or some components and/or operations shown as single components and/or operations may be implemented with multiple components and/or operations.

The embodiments disclosed above have been described in the context of various implementation details, but the principles of this disclosure are not limited to these or any other specific details. For example, some functionality has been described as being implemented by certain components, but in other embodiments, the functionality may be distributed between different systems and components in different locations and having various user interfaces. Certain embodiments have been described as having specific processes, operations, etc., but these terms also encompass embodiments in which a specific process, operation, etc. may be implemented with multiple processes, operations, etc., or in which multiple processes, operations, etc. may be integrated into a single process, step, etc. A reference to a component or element may refer to only a portion of the component or element. For example, a reference to an integrated circuit may refer to all or only a portion of the integrated circuit, and a reference to a block may refer to the entire block or one or more subblocks. The use of terms such as "first" and "second" in this disclosure and the claims may only be for purposes of distinguishing the things they modify and may not indicate any spatial or temporal order unless apparent otherwise from context. In some embodiments, a reference to a thing may refer to at least a portion of the thing, for example, "based on" may refer to "based at least in part on," "access" may refer to "access at least in part," and/or the like. A reference to a first element may not imply the existence of a second element. Various organizational aids such as section headings and the like may be provided as a convenience, but the subject matter arranged according to these aids and the principles of this disclosure are not limited by these organizational aids.

The various details and embodiments described above may be combined to produce additional embodiments according to the inventive principles of this patent disclosure. Since the inventive principles of this patent disclosure may be modified in arrangement and detail without departing from the inventive concepts, such changes and modifications are considered to fall within the scope of the following claims.

The invention claimed is:

1. A method of shuffling data, the method comprising:
shuffling a first batch of data using a first memory on a first level of a memory hierarchy to generate a first batch of shuffled data;
shuffling a second batch of data using the first memory to generate a second batch of shuffled data;
storing the first batch of shuffled data and the second batch of shuffled data in a second memory on a second level of the memory hierarchy;
partitioning a portion of the first batch of data which was streamed from the first memory, wherein partitioning includes generating a partition ID for a record in the first batch of data and the partition ID is used in sorting;
grouping a portion of the second batch of data in parallel with the partitioning of the portion of the first batch of data;
fetching a key column, and streaming a key from the key column; and
partitioning the key in parallel with the fetching.

2. The method of claim 1, further comprising merging the first batch of shuffled data and the second batch of shuffled data.

3. The method of claim 2, wherein merging the first batch of shuffled data and the second batch of shuffled data comprises merging the first batch of shuffled data and the second batch of shuffled data on a storage device.

4. The method of claim 1, further comprising partitioning the first batch of data based on streaming the portion of the first batch of data.

5. The method of claim 1, wherein shuffling the first batch of data using the first memory comprises randomly accessing a portion of the first batch of data from the first memory, wherein the first memory has a flat memory structure.

6. The method of claim 5, further comprising grouping the first batch of data based on randomly accessing the portion of the first batch of data.

7. The method of claim 6, wherein grouping the first batch of data comprises:
sorting the first batch of data; and
gathering the first batch of data based on the sorting.

8. The method of claim 7, wherein sorting the first batch of data comprises sorting pointers for the first batch of data.

9. The method of claim 1, further comprising generating one or more indices for the first batch of shuffled data based on partitioning the first batch of data.

10. The method of claim 9, further comprising merging the first batch of shuffled data and the second batch of shuffled data based on the one or more indices.

11. A data shuffling device comprising:
a partitioning circuit;
a grouping circuit; and
a buffer memory configured to:
store one or more records; and
stream one or more first portions of the one or more records to the partitioning circuit, and transfer, by random access one or more second portions of the one or more records to the grouping circuit, wherein the partitioning circuit is configured to partition the first portions of the one or more records, generate a partition ID for the one or more records and the partition ID is used in a sort operation, and in parallel, the grouping circuit is configured to group the second portions of the one or more records, wherein the buffer memory is further configured to fetch a key column and stream a key from the key column and the partitioning circuit is further configured to partition the key in parallel with the fetching.

12. The data shuffling device of claim 11, wherein the buffer memory is further configured to store at least one of the one or more records and stream the one or more first portions of the one or more records in parallel.

13. The data shuffling device of claim 11, wherein the buffer memory is further configured to stream the one or more first portions of the one or more records to the partitioning circuit and fetch one or more second portions of the one or more records in parallel.

14. The data shuffling device of claim 11, wherein the partitioning circuit is configured to perform a sort operation on the one or more first portions of the one or more records in parallel with the buffer memory storing at least one of the one or more records.

15. The data shuffling device of claim 11, wherein the partitioning circuit, and the buffer memory are configured to operate on batches of the one or more records.

16. The data shuffling device of claim 11, further comprising a grouping circuit, wherein the buffer memory is further configured to transfer, by random access, at least one of the one or more records to the grouping circuit.

17. A data shuffling device comprising:
a partitioning circuit;
a grouping circuit; and
a buffer memory configured to:
store one or more records; and
transfer, by random access, at least one of the one or more records to the grouping circuit, wherein the partitioning circuit is configured to partition first portions of the one or more records, generate a partition ID for the one or more records and the partition ID is used in a sort operation, and in parallel, the grouping circuit is configured to group second portions of the one or more records, wherein the buffer memory is further configured to fetch a key column, and stream a key from the key column, and the partitioning circuit is further configured to partition the key in parallel with the fetching.

18. The device of claim 17, further comprising a sorting circuit configured to sort the one or more records to generate a sort output, wherein the grouping circuit is configured to group the one or more records based on the sort output.

* * * * *